(No Model.)
W. W. GRISCOM.
MODE OF MAKING SECONDARY BATTERY PLATES.
No. 393,755. Patented Dec. 4, 1888.
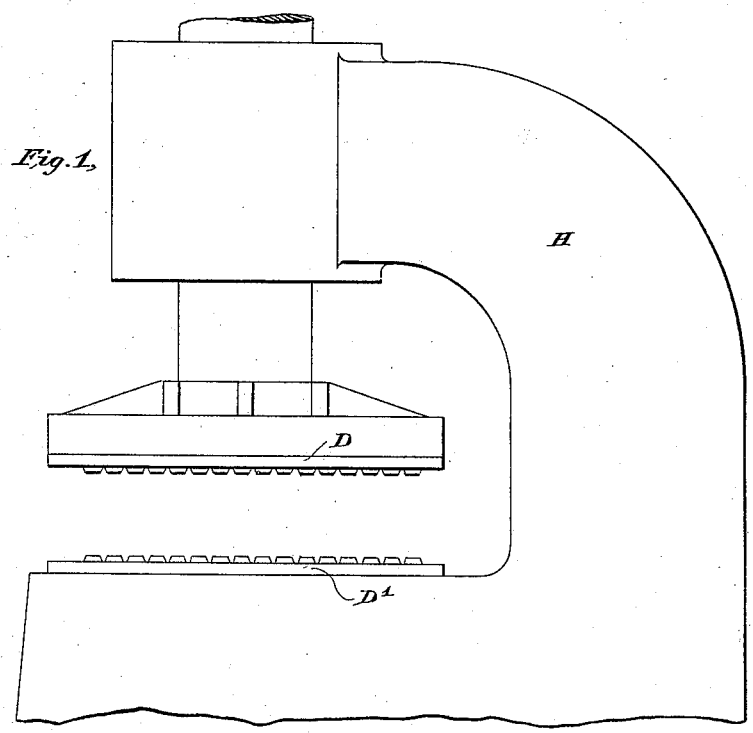
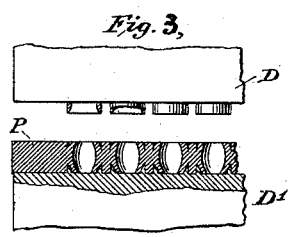

UNITED STATES PATENT OFFICE.

WILLIAM W. GRISCOM, OF HAVERFORD COLLEGE, PENNSYLVANIA, ASSIGNOR TO THE ELECTRICAL ACCUMULATOR COMPANY, OF NEW YORK.

MODE OF MAKING SECONDARY-BATTERY PLATES.

SPECIFICATION forming part of Letters Patent No. 393,755, dated December 4, 1888.

Application filed September 24, 1887. Serial No. 250,561. (No model.)

*To all whom it may concern:*

Be it known that I, WILLIAM W. GRISCOM, a citizen of the United States, and a resident of Haverford College, in the county of Montgomery and State of Pennsylvania, have invented certain new and useful Improvements in Secondary Batteries, of which the following is a specification My invention is an improvement in the method of preparing plates, grids, or supports for the active material in secondary batteries constructed according to the Faure process.

The object of my invention is to increase the conductivity, durability, and efficiency of such batteries.

I take a plate or form of lead of any suitable metal or alloy, which may be cast, pressed, or rolled, containing a series of cells, holes, or perforations, and subject it to pressure in a die or dies; and I form an incision in the surface of the plate around or in proximity to the holes, by virtue of which the body of metal will be condensed and the desired form or curvature given to the walls surrounding the said holes or perforations. I prefer to form an annular incision around each hole or perforation, at the same time contracting the walls thereof at or near the surface, so that the perforations of the finished product are contracted at or near the surfaces of the plate. By this means I increase the density of the metal divisions and vary the diameter of the holes or perforations at the surface of the plate or grid with respect to the diameter at or near the central plane.

The accompanying drawings illustrate an arrangement of apparatus devised by me and operating according to my invention.

Figure 1 shows a hydraulic press for operating the die. Fig. 2 is a section of a plate or grid to be operated upon. Fig. 3 shows a section of a completed plate and a section of the dies designed to produce an annular incision.

In Fig. 1, H is a fixed standard integral with the bed-plate carrying a die, D'. D is a second die, similar to D', and having a reciprocating movement with respect to D'. It is fixed to a rod moving in bearings in the standard H.

P, Fig. 2, is a plate of metal or alloy cast, rolled, or pressed, preferably of lead. It contains numerous circular or equivalent holes or perforations extending through the plate and separated from one another by webs, walls, or partitions of substantially uniform dimensions. Such plate should have the outline required for the finished product. This plate I place in the press H between the dies D D'. The form of these dies is best seen by reference to Fig. 3. The tubular sections, in diameter a little larger than the holes in the plate P, Fig. 2, have their inner edges beveled to present a sharp edge and the greatest diameter at the free ends. These dies D D' are caused to close upon the plate P with great pressure, forming an annular incision round each and every perforation, at the same time contracting the walls of the perforations at the surface. The active material is placed in these perforations in the form of a paste and hardens in position. The greatest diameter being at or near the center, the molds of active material cannot be removed without being broken or divided mechanically.

What I claim, and desire to secure by Letters Patent, is—

1. The improvement in the mode of making secondary-battery plates herein described, which consists in forming incisions in the surface of the plate in proximity to the holes or perforations and subjecting the plate so prepared to pressure, whereby the body of the metal is condensed and the diameter of the perforations at or near the surface of the plate is contracted with respect to the diameter at or near the central plane.

2. An improvement in the mode of making secondary-battery plates, which consists in forming annular incisions in the surface of the plate around the holes or perforations, and simultaneously subjecting the plates so prepared to pressure, in virtue of which the body of the metal will be condensed and the proper curvature of surface given to the surrounding walls of the holes.

3. The improvement in the mode of making secondary-battery plates herein described, which consists in taking a plate having a series of holes or perforations separated from each other by substantially uniform walls and forming an incision in the surface of the plate around or in proximity to such holes, whereby the walls or divisions are divided and the holes or perforations are contracted at or near the surface of the plate, substantially as described.

Signed at New York, in the county of New York and State of New York, this 23d day of September, A. D. 1887.

WM. W. GRISCOM.

Witnesses:
E. W. NEWKIRK,
W. H. SHOURDS.